Figure 1:
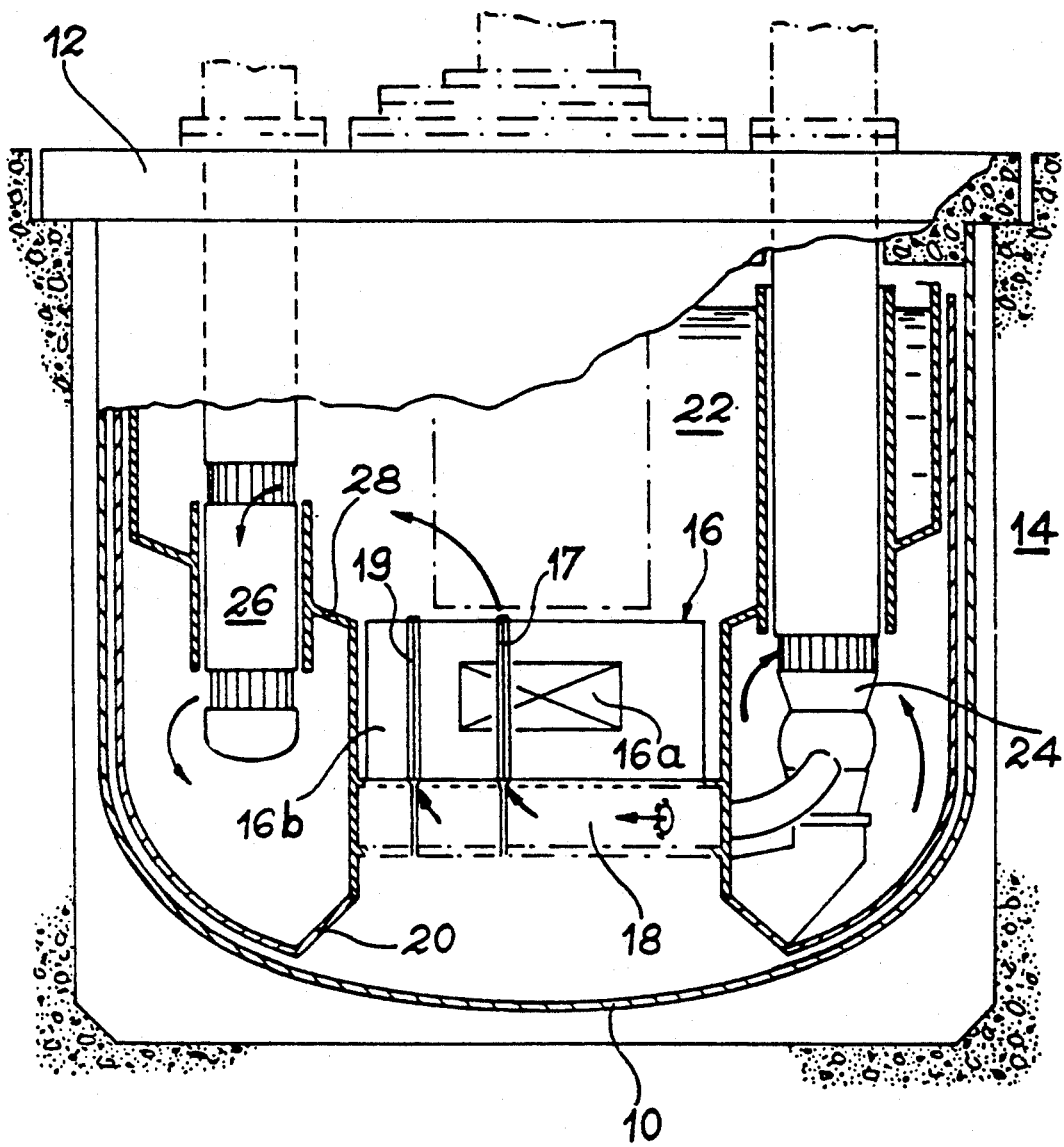

United States Patent [19]

Lemercier

[11] Patent Number: 5,333,156
[45] Date of Patent: Jul. 26, 1994

[54] NUCLEAR FUEL ASSEMBLY WITH AN INTEGRATED PASSIVE SAFETY DEVICE

[75] Inventor: Guy Lemercier, Le Puy Sainte Reparade, France

[73] Assignee: Commissariat a l'Energie Atomique, Paris, France

[21] Appl. No.: 966,463

[22] Filed: Oct. 26, 1992

[30] Foreign Application Priority Data

Nov. 8, 1991 [FR] France ................... 91 13817

[51] Int. Cl.⁵ ............................................. G21C 7/00
[52] U.S. Cl. .................................. 376/219; 376/240; 376/330; 376/336; 376/338
[58] Field of Search ............... 376/219, 240, 330, 336, 376/338

[56] References Cited

U.S. PATENT DOCUMENTS

| | | | |
|---|---|---|---|
| 3,795,580 | 3/1974 | Schively | 376/219 |
| 4,076,587 | 2/1978 | Taulier et al. | 376/336 |
| 4,139,414 | 2/1979 | Giuggio et al. | 376/336 |
| 4,654,192 | 3/1987 | Hutter et al. | 376/336 |
| 4,734,252 | 3/1988 | Bilibin | 376/336 |
| 4,889,683 | 12/1989 | Ford et al. | 376/336 |

FOREIGN PATENT DOCUMENTS 0197291 10/1986 European Pat. Off. .
2230984 12/1974 France .

Primary Examiner—Donald P. Walsh
Assistant Examiner—Frederick H. Voss
Attorney, Agent, or Firm—Oblon, Spivak, McClelland, Maier & Neustadt

[57] ABSTRACT

Certain of the nuclear fuel assemblies contained in a fast neutron nuclear reactor core have an integrated passive safety device.

More specifically, said device is constituted by an annular block (48) forming at least the lower part of the upper neutron protection (42) of the assembly. The block (48) is formed by elements (50) of a neutron-absorbing material, embedded in a matrix (52) meltable at a temperature above the temperature of the sodium during the normal operation of the reactor. A perforated, inner envelope (54) mechanically secures the block (48), whilst enabling the elements (50) to drop in the assembly following the melting of the matrix (52).

8 Claims, 2 Drawing Sheets

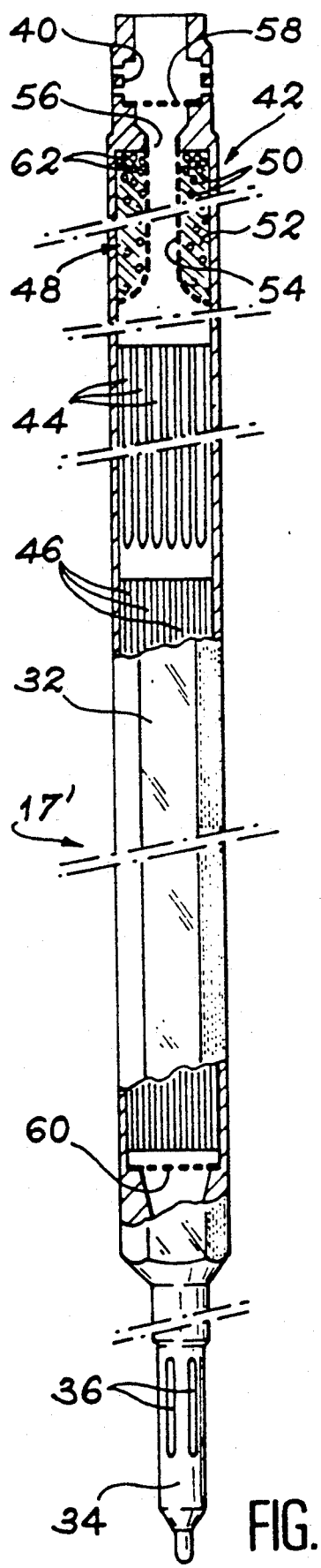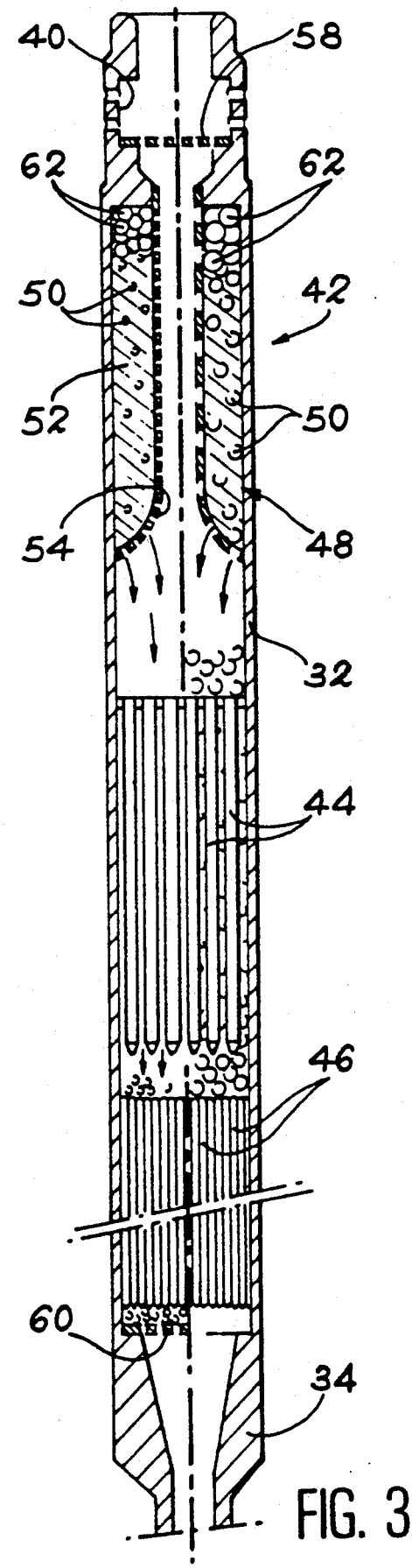

NUCLEAR FUEL ASSEMBLY WITH AN INTEGRATED PASSIVE SAFETY DEVICE

DESCRIPTION

The invention relates to a nuclear fuel assembly having an integrated passive safety device. Such an assembly is designed for placing in the core of a nuclear reactor, such as a liquid metalcooled fast neutron reactor, among the nuclear fuel assemblies having a conventional construction.

The core of a nuclear reactor comprises a central fuel zone, in which is placed a fissile material normally constituted by a mixed oxide of enriched uranium oxide and plutonium oxide. This fuel zone is completely surrounded by a covering of fertile material normally constituted by depleted uranium oxide.

In practice, this structure is obtained by juxtaposing vertical assemblies having a hexagonal section. Each of these assemblies comprises an outer tubular envelope, in which is placed a group or bundle of needles, each containing a pile of fissile and/or fertile material pellets. In the peripheral zone of the core the assemblies are formed by needles only containing fertile material pellets, so as to form fertile assemblies constituting the peripheral covering of the core. In the central part of the reactor core, the needles of each of the assemblies contain in their central portion fissile material pellets, whereas the fertile material pellets are placed at each of the ends of the pile, in order to form the lower axial covering and upper axial covering of the core. In the reminder of the present text, these latter assemblies will be referred to as "fissile assemblies", or nuclear fuel assemblies. Moreover, the term "fuel needle" or nuclear fuel needle will be used for the needles contained in these fissile assemblies.

In fast neutron nuclear reactors, certain of the locations occupied by the fissile and fertile assemblies are replaced by passages into which can drop control rods containing a neutron-absorbing material, so as to stop the fission reaction in the core in the case of an incident. In normal operation, these control rods are suspended above the core, e.g. by means of a grapnel or an electromagnet. They therefore constitute active safety devices, whose putting into operation requires an action on the member on which said rods are suspended.

As is more particularly illustrated by FR-A-2,251,079, these control rods can be designed in the form of an articulated assembly, so that their drop into the core bringing about the stoppage of the fission reaction can take place even if the assemblies constituting the core are deformed. This in particular ensures security, even in the case of an earthquake.

Existing active safety devices are generally controlled by the disappearance of a signal, e.g. a supply signal for the electromagnet on which the control rod is suspended, which contributes to reducing the risks of non-operation. However, the active character of these safety devices always requires an external action, so that there is still a minimum risk of non-operation of the control rods.

To obviate this disadvantage, consideration has been given to the addition to the active safety devices forming the control rods of passive safety devices designed so as to prevent a total failure of the control rods, combined with a partial or total loss of liquid metal flow within the reactor core, leading to a boiling of the liquid metal and to a power excursion.

As is more particularly illustrated by FR-A-2,230,984, these passive safety devices can be placed within certain of the nuclear fuel assemblies in the reactor core. More specifically, this document proposes placing within a tube positioned along the axis of the assembly in question, several elements made from a neutron-absorbing material or "absorbing elements", said elements being placed on a wire, above a lower abutment attached to said wire by means of a meltable or fusible material, the wire being suspended on the upper part of the tube by a meltable or fusible material.

The melting point of the meltable material exceeds the normal operating temperature of the reactor, so that the absorbing elements are normally maintained above the bundle of fuel needles positioned around the tube and within the assembly. Consequently, the absorbing elements then introduce no negative reactivity into the core.

When an incident, such as the stoppage of the primary pumps of the reactor, leads to an abnormal heating of the liquid cooling metal for the core, the meltable material melts, so that the absorbing elements drop into the lower part of the tube. The arrangement is then such that these element are level with the fissile part of the reactor core. Consequently they introduce negative reactivity into the latter making it possible to stop the fission reaction in the core.

A passive safety device of this type and as described in FR-A-2,230,984 makes it possible to achieve the sought result, i.e. preventing a total failure of the control rods, combined with a partial or total loss of the liquid metal flow in the core, leading to the boiling of the liquid metal and to a power excursion. However, the integrated device proposed in said document suffers from the disadvantage of significantly reducing the power of this assembly in which it is integrated, because the number of fuel needles is significantly reduced there. Due to the fact that the sought result requires the equipping of part of the assemblies constituting the reactor core with such a device, such a power reduction is prejudicial.

Moreover, the putting into operation of the passive safety device described in FR-A-2,230,984 is conditioned by meltable elements, which at the same time fulfil a mechanical supporting function for the neutron-absorbing material elements. In view of the fact that the dropping of the latter elements must occur prior to the boiling of the liquid metal, it is difficult to find a meltable material which, under these conditions, fulfil this mechanical support function at the normal operating temperature of the reactor. This means that it is not possible to exclude in normal operation an untimely functioning of the passive safety devices, which is another disadvantage which it is difficult to accept for such devices.

The main object of the invention is a nuclear fuel assembly incorporating an integrated, passive safety device, whose presence leads to no reduction of the fissile material quantity present in the assembly.

A further object of the invention is an assembly, whose untimely operation can be prevented as a result of the separation of the temperature-sensitive parts and the parts ensuring the mechanical supporting and securing of the absorbing elements.

According to the invention, the first of these objects is achieved by means of a nuclear fuel assembly having an integrated passive safety device, comprising an external tubular envelope in which are located, starting from the top, an upper neutron protection and a bundle of nuclear fuel needles, the passive safety device including elements made from a neutron-absorbing material, normally maintained above the bundle of nuclear fuel needles by meltable means, the latter automatically bringing about the dropping of said elements when the temperature exceeds a predetermined threshold, which is higher than the normal operating temperature, characterized in that the neutron-absorbing material elements are embedded in a matrix constituting said meltable means, in order to form an annular block constituting at least a lower part of the upper neutron protection.

Advantageously, the separation of the mechanical securing and temperature sensitivity functions is obtained by placing the annular block between the outer tubular envelope and an inner, securing tubular envelope, which is fixed to the outer envelope and provided with perforations permitting the passage of neutron-absorbing material elements following the melting of the matrix.

When it is wished to ensure an upper neutron protection following the melting of the matrix, in the upper part of the annular block are provided other neutron-absorbing material elements having a cross-section larger than that of the perforations of the inner, securing tubular envelope.

In order to ensure that the neutron-absorbing material elements are not displaced from the assembly by thermal conduction or natural convection, an upper retaining grid or grating is preferably placed in a central passage of the assembly above the annular block.

In a first embodiment of the invention, the neutron-absorbing material elements have a minimum cross-section exceeding that of the spaces separating the nuclear fuel needles. Consequently, during the melting of the matrix, these elements, which are e.g. in the form of balls, remain above the nuclear fuel needles.

When a bundle of fertile needles forming an upper axial covering is placed between the upper neutron protection and the bundle of nuclear fuel needles, so that the spaces separating the latter needles have a cross-section smaller than that of the spaces separating the fertile needles, the absorbing material elements in this case have a maximum cross-section smaller than that of the spaces separating the fertile needles. Therefore the absorbing elements penetrate between the fertile needles during the melting of the matrix.

In a second embodiment of the invention, the absorbing material elements have a maximum cross-section smaller than that of the spaces separating the nuclear fuel needles. Consequently, these elements drop between the nuclear fuel needles during the melting of the matrix. In this case, the downward escape of the absorbing material elements is advantageously prevented by means of a lower retaining grid placed in the outer tubular envelope below the bundle of nuclear fuel needles.

The invention is described in greater detail hereinafter relative to non-limitative embodiments and the attached drawings, wherein show:

FIG. 1 a cross-sectional view diagrammatically showing an integrated fast neutron reactor, whose core is formed at least partly by nuclear fuel assemblies according to the invention.

FIG. 2 a longitudinal sectional view of a nuclear fuel assembly having an integrated, passive safety device according to the invention.

FIG. 3 a longitudinal sectional view of a nuclear fuel assembly, on a larger scale, whose right and left-hand halves respectively illustrate a first and second embodiments according to the invention.

FIG. 1 very diagrammatically shows an integrated fast neutron nuclear reactor. In a conventional manner for a reactor of this type, the primary circuit means is contained in a vertically axed, main vessel 10, which is suspended on a horizontal sealing slab 12, which peripherally rests on the upper edge of a protective, concrete enclosure 14 surrounding the main vessel 10.

In the central part of the main vessel 10 is located the reactor core 16, which is mainly formed by the juxtaposing of fissile and fertile assemblies, which are vertically juxtaposed in accordance with a regular network, e.g. of the hexagonal type in the conventional case where the assemblies have a hexagonal cross-section. To facilitate the understanding of FIG. 1, only one fissile assembly 17 and one fertile assembly 19 are shown.

The lower part, generally called the base of each of the fissile and fertile assemblies constituting the reactor core 16, is fitted into a support 18, which simultaneously supports these assemblies and supplies them with liquid cooling metal. The support 18 rests on the bottom of the main vessel 10 via a floor plate 20.

In conventional manner for a reactor of this type, the main vessel 10 is filled with a liquid metal 22, e.g. constituted by sodium. Pumps 24, suspended on the sealing slab 12, permit the bottom to top circulation of the sodium 22 through the reactor core 16 and then in heat exchangers 26 also suspended on the sealing slab 12. In this way, the liquid metal which heats on traversing the reactor core 16 transmits the thus collected heat to the secondary fluid circulating in the heat exchangers 26, before being returned to the support 18 of the core 16 by the pumps 24. The separation between the relatively hot liquid metal leaving the reactor core 16 and the relatively cold liquid metal leaving the heat exchangers 26 is brought about by means of an internal vessel 28.

The structure and location of the fissile assemblies 17 and fertile assemblies 19 constituting the reactor core 16 are determined, as is very diagrammatically illustrated in FIG. 1, so as to define within the core 16 a central fuel or fissile zone 16a and a peripheral covering 16b completely surrounding the central zone 16a.

In the fissile assemblies 17, the fuel zone is constituted by mixed uranium and plutonium oxide pellets placed in juxtaposed needles. The axial upper and lower coverings are constituted by depleted uranium oxide pellets placed in the aforementioned pellets at each end of the pile of mixed uranium and plutonium oxide pellets or, for the axial upper covering, in other, larger diameter needles.

Furthermore, the fertile assemblies 19 placed around these fissile assemblies only contain depleted uranium oxide pellets placed in juxtaposed needles, in accordance with a configuration identical to that of the fissile assemblies.

According to the invention, certain of the fissile assemblies constituting the reactor core 16 have an integrated, passive safety device. The general structure of the thus constituted fissile assemblies will now be described relative to FIG. 2.

The fissile assembly designated in general manner by the reference 17' in FIG. 2, has a general structure similar to that of conventional fissile assemblies. Thus, the assembly 17' with an integrated, passive safety device shown in FIG. 2, comprises an outer, tubular envelope 32, which has a hexagonal cross-section and is extended downwards by a base or stand 34 similar to that of the conventional assemblies 17. The base 34 enables the assembly 17' to rest on the support 18 (FIG. 1) and to be supplied by liquid metal by said support through supply holes 36 and a not shown vacuumizing device e.g. constituted by a system of diaphragms controlling the pressure drop as a function of the location occupied by the assembly in the reactor core.

At its upper end, the outer, tubular envelope 32 has a gripping ramp 40 allowing the handling of the assembly 17' by conventional, not shown handling means, in the same way as for the fissile assemblies 17 and the fertile assemblies 19 constituting the reactor core 16.

Below the gripping ramp 40, the outer, tubular envelope 32 contains, starting from the top, an upper neutron protection 42 having an annular configuration, an upper, axial covering formed by a bundle of fertile needles 44 and a fuel zone formed by a bundle of nuclear fuel needles 46.

The fertile needles 44 like the fissile needles 46 are arranged in parallel to the longitudinal axis of the assembly 17' and occupy the entire cross-section thereof, in the same way as in conventional fissile assemblies 17. Moreover, it should be noted that the cross-section of the fertile needles 44 exceeds the cross-section of the fissile needles 46, in such a way that the cross-section of the spaces formed between the fertile needles 44 is larger than the cross-section of the spaces formed between the fissile needles 46.

According to the invention, the upper neutron protection 42 of the assembly 17' is constituted, at least in its lower part, by an annular block 48 forming a passive safety device integrated into said assembly.

More specifically, the annular block 48 is formed from elements 50 made from a neutron-absorbing material, such as boron or boron carbide $B_4C$ embedded in a matrix 52 made from a good heat conducting material and which is in the solid state at the normal operating temperature of the reactor, but whose melting point is well below the boiling point of sodium at the pressure in question. The annular block 48 is produced by moulding and is then machined to the desired dimensions, before being placed within the tubular envelope 32, to form there at least the lower part of the upper neutron protection 42 or, as illustrated in FIGS. 2 and 3, all said neutron protection.

In practice, the neutron-absorbing material elements 50 are advantageously in the form of grains, balls or small spheres, whose cross-section can assume different values as a function of the embodiment in question, as will be shown hereinafter.

Moreover, the material constituting the matrix 52 can be aluminium, an aluminium alloy or aluminium reinforced with silicon carbide or alumina fibres. Thus, the melting point of aluminium (approximately 660° C.) is roughly 100° C. above the temperature of sodium under the normal operating conditions of the reactor (approximately 550° C.) and approximately 300° C. below the boiling point of sodium at the pressure in question (approximately 950° C.). In addition, aluminium is a very good heat conductor, is chemically compatible with sodium and has a low effective neutron absorption cross-section.

As is diagrammatically shown in FIG. 2, the annular block 48 is advantageously held by an inner, tubular envelope 54, whose two ends are fixed, e.g. by welding, to the outer, tubular envelope 32. This inner, holding envelope 54, which can in particular be made from stainless steel, fulfils the function of mechanically securing the elements 50 embedded in the matrix 52, the latter then only having the function of releasing the elements 50, when the temperature increases beyond a predetermined value.

Therefore there is no untimely release of the elements 50, when the reactor is functionning normally.

To permit the flow of the neutron-absorbing material elements 50 when the predetermined temperature is reached, the inner, retaining envelope 54 has numerous perforations regularly distributed over its entire surface and whose cross-section is greater than the maximum section of the elements 50.

The upper neutron protection 42 incorporating the annular block 48 held by the inner, tubular envelope 54 has a shape similar to that of the upper neutron protection of a conventionally designed fissile assembly 17. In particular, the upper neutron protection 42 internally defines a central or axial passage 56, formed along the vertical axis of the assembly and by which flows towards the top the liquid metal travelling between the needles 46 and 44 within the assembly 17'.

To ensure that the elements 50 do not escape to the outside of the assembly 17' through the top of the latter following the melting of the matrix 52, an upper retaining grid or grating 58 is placed in the passage 56 immediately below the gripping ramp 40. The cross-section of the passages formed in said grid 58 is smaller than the minimum cross-section of the elements 50, but the pressure drop induced by the presence of said grid 58 is as small as possible and for this purpose the grid 58 can be constituted by a screen.

As stated hereinbefore, the elements 50 embedded in the matrix 52 for forming the annular block 48 can have different cross-sections as a function of the considered embodiment. More specifically, the cross-section of these elements 50 can exceed that of the passages formed between the nuclear fuel needles 46, whilst being smaller than the cross-section of the passages formed between the fertile needles 44, as shown in the right-hand half of FIG. 3.

Conversely, in a second embodiment of the invention illustrated in the left-hand half of FIG. 3, the neutron-absorbing material elements 50 have a cross-section smaller than that of the passages formed between the nuclear fuel needles 46, the cross-section of the latter being smaller than that of the passages formed between the fertile needles 44, as stated hereinbefore.

A description will now be given of the operation of the nuclear fuel assemblies according to the invention, in each of the two embodiments illustrated in the right and left-hand halves of FIG. 3.

In both cases, the mechanical behaviour of the annular block 48 is ensured throughout the operation of the reactor by the inner, tubular envelope 54 welded to the outer, tubular envelope 32, as stated hereinbefore. The only function of the matrix 52 is then to maintain the cohesion of the pile of neutron-absorbing material elements 50. The block 48 is cooled by the normal liquid metal flow circulating in the assembly 17'.

In the case of a cooling incident with respect to the assembly, there is virtually no circulation of the liquid metal and rapid heating takes place on contact with the nuclear fuel needles 46. By heat conduction or natural convection, this liquid metal heats the matrix 52 up to its melting point. The neutron-absorbing material elements 50, whose cross-section is smaller than that of the perforations of the inner, tubular, securing envelope 54 are displaced by gravity and by the floating of the molten material constituting the matrix 52 and denser than sodium.

In the two embodiments illustrated in FIG. 3, the neutron-absorbing material elements 50 flow into the passages having a substantially triangular cross-section formed between the fertile needles 44 of the upper, axial covering of the assembly 17'.

In the first embodiment illustrated in the right-hand half of FIG. 3, the elements 50 cannot penetrate between the nuclear fuel needles 46. Therefore these elements 50 remain blocked above the needles 46 in order to form several beds of absorbent material elements, which introduce a negative reactivity by "neutron shadow" in the reactor core. If several assemblies 17' are placed in the reactor core at carefully chosen locations, the nuclear reaction can in this way be stopped. The upper retaining grid 58 prevents any flying off of elements 50 into the primary circuit of the reactor.

In the second embodiment of the invention illustrated in the left-hand half of FIG. 3, the neutron-absorbing material elements can also flow into the substantially triangular passages formed between the nuclear fuel needles 46. Therefore these elements 50 directly penetrate the fissile zone of the reactor core.

In this case and as illustrated in FIG. 2 and in the left-hand half of FIG. 3, a lower retaining grid 60 is mounted within the outer, tubular envelope 32 below the bundle of nuclear fuel needles 46. This grid, which has a low pressure drop like the grid 58, has perforations, whose small cross-section makes it possible to retain the neutron-absorbing material elements 50. As in the first embodiment, a stoppage of the nuclear reaction 25 can thus be obtained in the reactor core by arranging several assemblies 17' at appropriately chosen locations.

As has already been stated, the assemblies 17' according to the invention have the same power as the conventional nuclear fuel assemblies 17. Obviously, the number and distribution of said assemblies 17' in the core are a function of the efficiency, diversification and redundancy sought compared with the normal and complementary reactor stopping means provided in the reactor. It is possible to envisage forming the entire central part of the reactor core with the aid of assemblies 17' according to the invention.

It should also be noted that no matter which embodiment is involved, the block 48 can have in its upper part neutron-absorbing material elements 62 with a cross-section substantially larger than that of the elements 50 which can drop into the assembly during the melting of the matrix 52. More specifically, the cross-section of said elements 62 exceeds that of the passages formed in the inner, securing envelope 54, so that said elements remain within the envelope following the melting of the matrix 52. Thus, following the melting of the matrix 52, the assembly has a minimum of upper neutron protection.

Obviously, the invention is not limited to the embodiments described in exemplified manner herein and covers all variants thereof. Thus, the invention can also apply to an assembly in which the upper axial covering is integrated into the nuclear fuel needles 46, the dimensions of the neutron-absorbing material elements then being in accordance with those of the second embodiment. Moreover, the neutron-absorbing material elements 50 embedded in the matrix 52 can have different cross-sections and shapes, the first and second embodiments of the invention being combinable, provided that the elements having the smaller cross-section are placed in the lower part of the block 48.

I claim:

1. Nuclear fuel assembly having an integrated passive safety device, comprising an external tubular envelope in which are located, starting from the top, an upper neutron protection and a bundle of nuclear fuel needles, the passive safety device including elements made from a neutron-absorbing material, normally maintained above the bundle of nuclear fuel needles by meltable means, the latter automatically bringing about the dropping of said elements when the temperature exceeds a predetermined threshold, which is higher than the normal operating temperature, wherein the neutron-absorbing material elements are embedded in a matrix constituting said meltable means, in order to form an annular block constituting at least a lower part of the upper neutron protection.

2. Assembly according to claim 1, wherein the annular block is placed between the outer, tubular envelope and an inner, tubular, securing envelope fixed to the latter and provided with perforations permitting the passage of neutron-absorbing material elements.

3. Assembly according to claim 2, wherein the annular block has in its upper part other neutron-absorbing material elements with a cross-section larger than the perforations of the inner, tubular, securing envelope.

4. Assembly according to claim 1, wherein an upper retaining grid is placed in the central passage of the assembly above the annular block.

5. Assembly according to claim 1, wherein the absorbing material elements have a minimum cross-section larger than the cross-section of the spaces separating the nuclear fuel needles.

6. Assembly according to claim 5, wherein a bundle of fertile needles forming an upper axial covering is placed between the upper neutron protection and the bundle of nuclear fuel needles, the latter being separated by spaces having a cross-section smaller than that of the spaces separating the fertile needles, the absorbing material elements having a maximum cross-section smaller than the cross-section of the spaces separating the fertile needles.

7. Assembly according to claim 1, wherein the absorbing material elements have a maximum cross-section smaller than that of the spaces separating the nuclear fuel needles.

8. Assembly according to claim 7, wherein a lower retaining grid is placed in the outer, tubular envelope below the bundle of nuclear fuel needles.

* * * * *